United States Patent
Xue et al.

(10) Patent No.: US 8,274,967 B2
(45) Date of Patent: Sep. 25, 2012

(54) METHOD, SYSTEM AND GATEWAY FOR REMOTELY ACCESSING MPLS VPN

(75) Inventors: Ming Xue, Beijing (CN); Xiaoping Han, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 221 days.

(21) Appl. No.: 12/836,439

(22) Filed: Jul. 14, 2010

(65) Prior Publication Data

US 2011/0013637 A1  Jan. 20, 2011

(30) Foreign Application Priority Data

Jul. 15, 2009  (CN) .......................... 2009 1 0088986

(51) Int. Cl.
*H04L 12/66* (2006.01)
(52) U.S. Cl. ......... 370/352; 370/389; 709/203; 709/227
(58) Field of Classification Search .................. 370/352, 370/389, 401; 709/203, 227
See application file for complete search history.

(56) References Cited

U.S. PATENT DOCUMENTS

| | | | |
|---|---|---|---|
| 7,039,687 B1 | 5/2006 | Jamieson et al. | |
| 7,817,668 B2 * | 10/2010 | Igarashi et al. | 370/474 |
| 2007/0140250 A1 * | 6/2007 | McAllister et al. | 370/392 |
| 2008/0034416 A1 * | 2/2008 | Kumar et al. | 726/15 |
| 2008/0225852 A1 * | 9/2008 | Raszuk et al. | 370/392 |
| 2008/0263209 A1 * | 10/2008 | Pisharody et al. | 709/227 |
| 2010/0043068 A1 * | 2/2010 | Varadhan et al. | 726/15 |

FOREIGN PATENT DOCUMENTS

| | | |
|---|---|---|
| CN | 1414753 A | 4/2003 |
| CN | 1863127 A | 11/2006 |
| CN | 101355557 A | 1/2009 |

* cited by examiner

*Primary Examiner* — Jung Park
(74) *Attorney, Agent, or Firm* — Marshall, Gerstein & Borun LLP

(57) ABSTRACT

A method, system and gateway for remotely accessing an MPLS VPN are provided. In the method, multiple virtual interfaces are established in an SSL VPN gateway, one virtual interface is bound with one VPN, different VPN users are differentiated according to authentication and authorization information of users, and the authentication and authorization information of the users is respectively bound with corresponding VPNs. When the SSL VPN gateway receives a packet sent by a user, an inner label and an outer label are added to the packet according to a VPN instance bound with the user; when receiving a response packet from a resource server, the SSL VPN gateway searches for a VPN instance according to the VPN label, and forwards the response packet to the user through the SSL connection according to the found VPN instance.

19 Claims, 7 Drawing Sheets

METHOD, SYSTEM AND GATEWAY FOR REMOTELY ACCESSING MPLS VPN

CROSS-REFERENCE TO RELATED APPLICATION

This application claims the priority benefit of Chinese Patent Application No. 200910088986.1, filed Jul. 15, 2009, the entire disclosure of which is incorporated herein by reference.

FIELD OF THE INVENTION

The present invention relates to Secure Socket Layer Virtual Private Network (SSL VPN) technologies and Multi-Protocol Label Switching Virtual Private Network (MPLS VPN) technologies, and more particularly to a method and system for remotely accessing an MPLS VPN, and a gateway applied to the system.

BACKGROUND OF THE INVENTION

Secure Socket Layer Virtual Private Network (SSL VPN) is a Virtual Private Network (VPN) technology which implements remote access by using a Secure Socket Layer (SSL) encryption connection. FIGS. 1A and 1B show diagrams illustrating network structures of the SSL VPN. As shown in FIG. 1A, an SSL connection is established between a remote host and an SSL VPN gateway, and packets are transmitted on the Internet in an encryption mode. The SSL VPN gateway terminates the SSL connection, transmits a request from the remote host in a plain language mode through a Transmission Control Protocol (TCP) connection established between the SSL VPN gateway and a VPN resource server of an inner network or through direct IP forwarding, and transmits a response of a server to the remote host through the SSL connection Remote access modes of users include a TCP access mode, a WEB access mode and an IP access mode. Remote access processes of the TCP access mode and the WEB access mode are the same, while are a little different from a remote access process of the IP access mode. Specifically, in the TCP/WEB ("/" indicates "or") access mode, the remote access process includes the following steps.

Step A, a user1 performs information interaction with an SSL VPN gateway, and establishes a connection related to a remote access. Step A specifically includes the following.

a1: through a remote host, the user1 requests the SSL VPN gateway to perform logon and authentication; the SSL VPN gateway returns a user resource page to the user1 after the used passes the logon and authentication, and the user resource page includes VPN resource information that the used is allowed to access.

a2: through the remote host, the user1 establishes an SSL connection with the SSL VPN gateway when requesting accessing a VPN resource; in the TCP/WEB access mode, the gateway needs to maintain a bidirectional connection relation table, i.e. the SSL connection between the SSL VPN gateway and the user host and a TCP connection between the SSL VPN gateway and a VPN resource server; hence, the used sends a user identity (ID) and an ID of the VPN resource requested to be accessed to the SSL VPN gateway through the SSL connection established. The user ID is used to identify a user, and the ID of the VPN resource is used to indicate the resource requested to be accessed.

a3: according to the ID of the VPN resource, the SSL VPN gateway establishes and maintains the TCP connection between the SSL VPN gateway and a VPN resource server 1 to which the VPN resource requested to be accessed belongs for the user1. Two ends of the TCP connection established for the used are: a private network address of a physical exit interface on the SSL VPN gateway, 172.1.1.1, and a private network address of the VPN resource server 1, 10.3.1.1.

Step B, after the connection related to the remote access is established, the user1 sends a packet to the SSL VPN gateway through the SSL connection, and the SSL VPN gateway sends the packet received through the SSL connection to the VPN resource server 1 through the TCP connection established for the user1.

In the TCP/WEB access mode, the user1 does not need to know the address of the VPN resource server, thus the packet sent from the user1 to the SSL VPN gateway merely carries a public network IP header. In the packet sent by the user1, such as packet ① shown in FIG. 1A, a public network source address in the public network IP header is a public network address of a remote host used by the user1, 60.191.123.24, and a public network destination address in the public network IP header is a public network address of the SSL VPN gateway, 220.189.204.90.

The core component of the SSL VPN gateway is an SSL VPN service unit. The SSL VPN service unit includes three modules, a TCP access mode processing module, a WEB access mode processing module and an IP access mode processing module. Packet forwarding procedures of the TCP access mode processing module and the WEB access mode processing module are similar, and thus the above two modules may be deemed as one module, i.e. a TCP/WEB access mode processing module. The TCP/WEB access mode processing module operates on an application layer, while the IP access mode processing module operates on both the application layer and an IP layer.

In the TCP/WEB access mode, the forwarding process in step B includes sub-steps b1~b3.

b1: after the packet enters the SSL VPN gateway through the SSL connection, the IP layer removes the public network IP header and sends the data part of the packet to the TCP/WEB access mode processing module located on the application layer via a TCP layer;

b2: the TCP/WEB access mode processing module determines to forward the received packet through the TCP connection established for the user1 according to the bidirectional connection relation table; in this case, the packet is sent to the TCP layer;

b3: the TCP layer adds a private network IP header to the packet according to the TCP connection established for the user1 (172.1.1.1 to 10.3.1.1), and sends the packet to the IP layer; where a private network source address and a private network destination address in the private network IP header are 172.1.1.1 and 10.3.1.1 respectively;

b4: the IP layer performs route searching according to a destination address of the packet, and then forwards the packet via the physical exit interface 172.1.1.1. In the forwarded packet, such as a packet ② shown in FIG. 1A, the private network source address and the private network destination address in the private network IP header are 172.1.1.1 and 10.3.1.1 respectively.

Step C, the SSL VPN gateway receives a response packet returned by the VPN resource server 1 through the TCP connection, and returns the response packet to the user1 through the SSL connection. This step equals to a reverse operation of the step B. First, the IP layer removes the private network IP header of the response packet and sends the response packet to the TCP/WEB access mode processing module through the TCP layer, and the TCP/WEB access mode processing module determines to return the response packet through the SSL connection between the user1 and the TCP/WEB access mode processing module. Then, the TCP layer adds a public network IP header to the response packet. And finally, the IP layer performs the route searching and forwards the response packet.

Thus, the remote access in the TCP/WEB access mode is finished.

When the user1 performs the remote access in the IP access mode, an address pool used for allocating addresses for users needs to be established. The access process still includes the above steps A, B and C, but specific implementation of each step is different.

In step A, the SSL VPN gateway, besides returning the user resource page, also needs to randomly select one IP address from the address pool and allocate the IP address to the user1 as a source address, i.e. a virtual address used by the user1 when accessing the VPN resource server. It is supposed that the virtual address is 10.1.1.2. When the user1 needs to access the VPN resource, only the SSL connection rather than the TCP connection is established. However, the SSL VPN gateway needs to maintain a relation table of the users, the virtual addresses and the SSL connections, but does not need to know the VPN resource server to be accessed by the user1. Therefore, during the information interaction with the SSL VPN gateway, the user1 only needs to send the user ID to the SSL VPN gateway through the SSL connection established.

In step B, the user1 still sends the packet to the SSL VPN gateway through the SSL connection, and the packet includes not only the public network IP header as described above, but also a private network IP header. In the packet sent by the user1, such as a packet ① shown in FIG. 1B, the public network IP header of the packet ① is the same as that shown in FIG. 1A, a private network source address is the virtual address of the user1, 10.1.1.2, and a private network destination address is a private network address of the VPN resource server to be accessed, 10.3.1.1. The private network address of the VPN resource server may be obtained by the user1 in advance.

When the SSL VPN gateway receives the packet, the IP layer removes the public network IP header, and sends the packet to the IP access mode processing module through the TCP layer. The IP access mode processing module determines to transmit the packet directly according to the private network IP header. The packet without the public network IP header may be a packet ② as shown in FIG. 1B.

In step C, the SSL VPN gateway receives a response packet returned by the VPN resource server 1; the IP access mode processing mode determines to return the response packet through the SSL connection between the IP access mode processing mode and the user1 according to the relation table of the users, the virtual addresses and the SSL connections; and then the TCP layer adds a public network IP header to the response packet, and the IP layer performs the route searching and forwards the response packet to the user1.

Thus, the remote access in the IP access mode is finished.

MPLS L3VPN is a Layer 3 (L3) VPN technology based on a Provider Edge (PE) router in VPN solutions of service providers. MPLS L3VPN issues VPN routes in an MPLS network by using a Border Gateway Protocol (BGP), forwards an MPLS packet in the MPLS network by using label forwarding. FIG. 2 is a schematic diagram illustrating a conventional network structure of an MPLS L3VPN. As shown in FIG. 2, the MPLS L3VPN model consists of the following three parts.

A Customer Edge (CE) device, called CE for short, has an interface directly connecting with a Provider Edge (PE) router. The CE may be a router, an exchanger or a host. The CE can not "apperceive" existence of the VPN and does not need to support the MPLS.

A PE router, called PE for short, is an edge device of the MPLS network, and directly connects with the CE. In the MPLS network, all processing of VPN information is maintained in the PE. VPN Routing & Forwarding Instances, called VPN instances, are stored in the PE. A routing forwarding table and an MPLS label forwarding table are included in the VPN instance. The routing forwarding table includes two kinds of routes, one is for indicating an exit interface through which a packet from the CE is to be forwarded, and the other is for indicating an exit interface through which a packet from the P router is to be forwarded. The MPLS label forwarding table includes two kinds of table entries, one is a VPN label (inner layer label) of each VPN, and the other is a forwarding entry, i.e. for indicating next hop P router information and an MPLS forwarding label for a packet from the CE.

The P router, called P for short, is a backbone router of the MPLS network, does not directly connect with the CE, only needs to have basic MPLS forwarding capability and does not need to maintain VPN information.

As shown in FIG. 2, different physical interfaces of the PE router connect with different CE devices, one physical interface is bound with one VPN, and a VPN instance of the VPN is formed according to the physical interface bound with the VPN. When a packet from a CE device enters through a certain physical interface of the PE, the PE router determines a VPN to which the packet belongs according to the physical interface, and forwards the packet by using the VPN instance of the VPN to which the packet belongs. The forwarding processing includes: searching for an exit interface of the packet according to a routing forwarding table, and searching for a VPN label (inner layer label), an MPLS forwarding label (outer layer label), next hop P device information and the like according to the MPLS label forwarding table; adding a VPN label and an MPLS label to the packet according to the found information, and forwarding the packet. When receiving a packet from the P router, the PE router searches for a VPN instance according to the VPN label contained in the packet, and forwards the packet to the CE device through a physical interface bound with the VPN instance. Conventionally, the PE router may also differentiate different VPN users according to Virtual Local Area Network (VLAN) access information.

When a local area network connecting with the SSL VPN gateway in FIGS. 1A and 1B adopts the MPLS L3VPN, it is urgently to solve the following problems: how to connect the SSL VPN gateway with a device in the MPLS L3VPN, how to forward a packet received through the SSL connection to the MPLS network so as to make a remote user remotely access a VPN resource server in the MPLS VPN through the SSL connection. However, there is no solution for those problems currently.

SUMMARY OF THE INVENTION

An embodiment of the present invention provides a method for remotely accessing an MPLS VPN, so that a remote user can remotely access a VPN resource in the MPLS VPN through an SSL connection between the remote user and an SSL VPN gateway.

The remote user remotely accesses a VPN resource server in the MPLS VPN through the SSL connection between the remote user and the SSL VPN gateway, and the SSL VPN gateway also functions as a PE router in the MPLS network. And packets received by the SSL VPN gateway from the VPN resource server or transmitted by the SSL VPN gateway to the VPN resource server are transmitted through the MPLS network.

The method includes steps of:

A: establishing multiple virtual interfaces in the SSL VPN gateway, one virtual interface being bound with one VPN, and forming VPN instances according to the virtual interfaces bound with VPNs, differentiating different VPN users according to authentication and authorization information of users, and binding the authentication and authorization information of the users with VPNs respectively;

B: performing, by a user, information interaction with the SSL VPN gateway, and establishing a connection related to a remote access;

C: receiving, by the SSL VPN gateway, a packet sent by the user x through the SSL connection, adding a VPN label and an MPLS forwarding label to the packet according to a VPN instance bound with authentication and authorization information of the user x, and sending the packet to the VPN resource server through the MPLS network; and D: receiving, by the SSL VPN gateway, a response packet from the VPN resource server, searching for a VPN instance according to a VPN label carried by the response packet, and forwarding the response packet to the user through the SSL connection according to the found VPN instance.

An embodiment of the present invention provides a gateway, functioning as an SSL VPN gateway and a PE router, so that a remote user can remotely access a VPN resource in an MPLS VPN through an SSL connection between the remote user and an SSL VPN gateway. The gateway functions as an SSL VPN gateway in the SSL VPN and a PE router in the MPLS VPN, and includes:

a configuration unit, a first network interface, a second network interface, a processing unit, a VPN instance storing unit and a relation storing unit;

wherein the configuration unit is adapted to establish multiple virtual interfaces, one virtual interface being bound with one VPN, form VPN instances according to the virtual interfaces bound with the VPNs, save the VPN instances in the VPN instance storing unit; differentiate different VPN users according to authentication and authorization information of users, bind the authentication and authorization information of the users with corresponding VPNs respectively; save binding relations in the relation storing unit;

wherein the relation storing unit is adapted to store the binding relations established by the configuration unit;

wherein the VPN instance storing unit is adapted to store the VPN instances;

wherein the first network interface is adapted to provide a data transmission channel between the gateway and the users;

wherein the second network interface is adapted to provide a data transmission channel between the gateway and an MPLS network;

wherein the processing unit is adapted to perform information interaction with a user and establish a connection related to a remote access; when receiving a packet sent by the user x through the SSL connection, obtain a VPN instance bound with authentication and authorization information of the user x from the VPN instance storing unit according to a binding relation stored in the relation storing unit, add a VPN label and an MPLS forwarding label to the packet by using the VPN instance obtained, send the packet to the VPN resource server through the MPLS network; when receiving a response packet from the VPN resource server, search for a corresponding VPN instance in the VPN instance storing unit according to a VPN label carried by the response packet, and forward the response packet to the user x through the SSL connection according to the found VPN instance.

An embodiment of the present invention provides a system for remotely accessing an MPLS VPN, so that a remote user can remotely access a VPN resource in the MPLS VPN through an SSL connection between the remote user and an SSL VPN gateway. The system includes any kinds of gateway described above. The system includes the gateway described above.

As can be seen from the above technical scheme, in order to implement multiple VPN instances when there is only one physical interface, embodiments of the present invention establish virtual interfaces bound respectively with VPNs, and thus each VPN binds with one virtual interface, so that VPN instances corresponding to different VPNs are formed and used when a packet is forwarded.

In addition, embodiments of the present invention differentiate different VPN users by using authentication and authorization information of users, so that the users can be differentiated when the SSL VPN gateway provides only one physical interface for the users, and thus can further forward the packet by using a corresponding VPN instance, thereby implementing the scheme of remotely accessing the VPN resource in the MPLS VPN by the remote user.

DETAILED DESCRIPTION OF THE INVENTION

In embodiments of the present invention, an SSL VPN gateway also functions as a PE router in an MPLS L3VPN, so as to solve a problem of connecting the SSL VPN gateway and the MPLS L3VPN. The MPLS VPNs described below all indicate the MPLS L3VPN.

Figure 3:
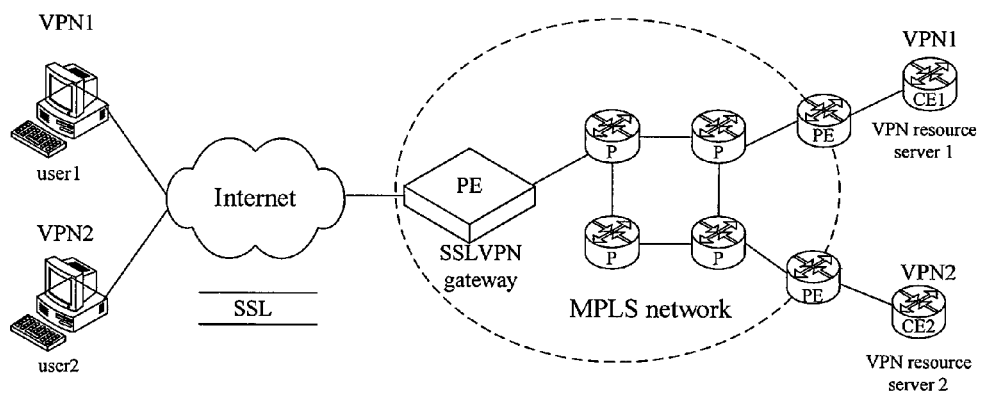
FIG. 3 is a schematic diagram illustrating a network structure when an SSL VPN gateway also functions as a PE router.

FIG. 3 is a schematic diagram illustrating a network structure when an SSL VPN gateway also functions as a PE router. As shown in FIG. 3, a user1 belongs to a VPN1, a user2 belongs to a VPN2, and the two users access VPN resources respectively through different remote hosts; a CE1 and a CE2 are VPN resource servers, a VPN1 resource is configured at the CE1, and a VPN2 resource is configured at the CE2. Data are transmitted between the remote host and the SSL VPN gateway through an SSL connection, and the SSL VPN gateway functions as a PE router at the same time and connects with a P router in an MPLS network.

Figure 1A:
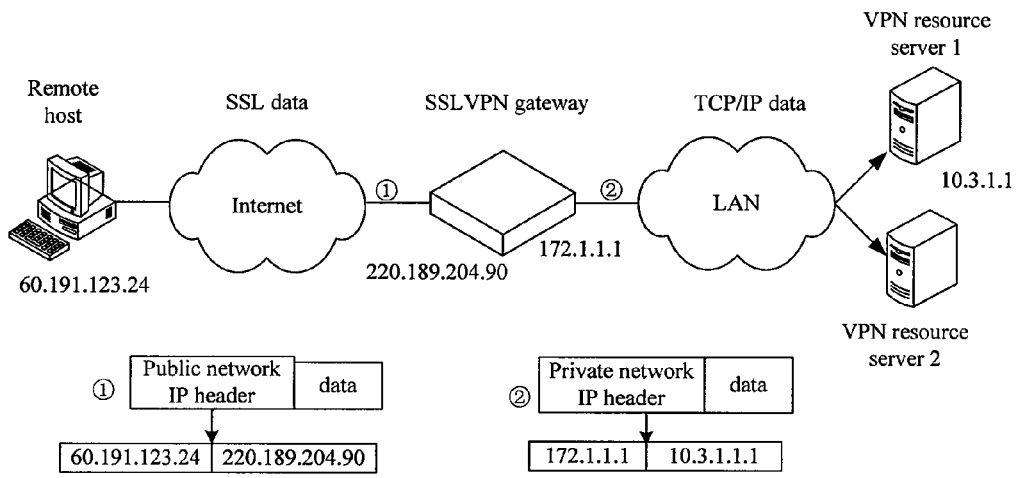
FIG. 1A is a schematic diagram illustrating a conventional network structure of an SSL VPN.
Figure 1B:
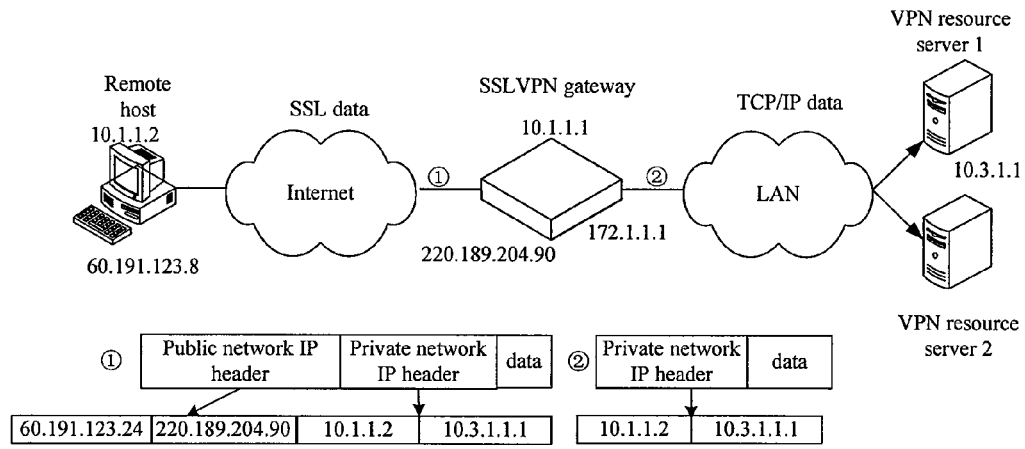
FIG. 1B is a schematic diagram illustrating a conventional network structure of an SSL VPN.
Figure 2:
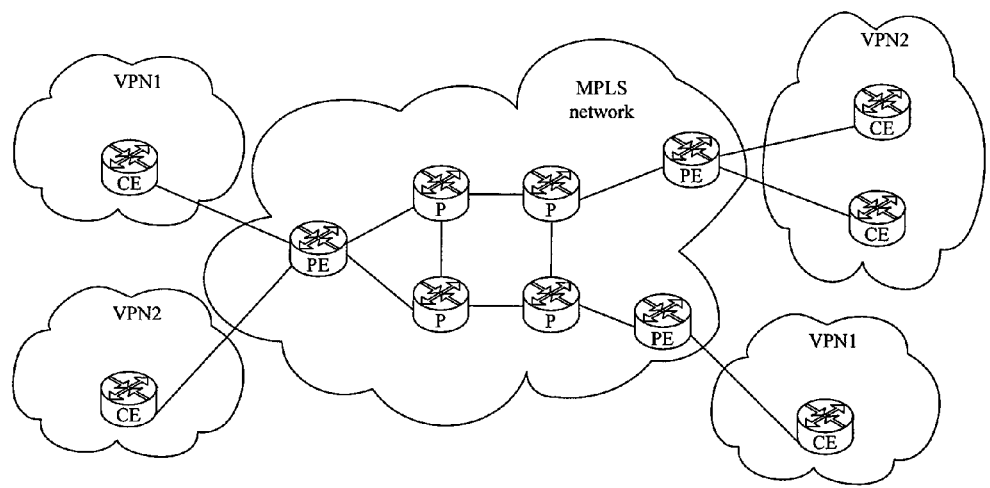
FIG. 2 is a schematic diagram illustrating a conventional networking structure of an MPLS L3VPN.

The SSL VPN gateway, functioning as the PE router, is different from the PE router shown in FIG. 2. The SSL VPN gateway only provides the external with one network interface, i.e. as shown in FIG. 3, the SSL VPN gateway provides the external, i.e. the Internet and the MPLS network respectively, with one network interface. Thus, the SSL VPN gateway can not bind physical interfaces with VPNs as common PE routers do, so as to differentiate different VPN users by using entrance interfaces of packets. Further, the SSL VPN gateway is configured between the Internet and a local area network, and packets received from users have already been transmitted through the Internet and thus do not carry VLAN access information. Thus, different VPN users can not be differentiated according to the VLAN access information carried by the packets, either. However, when the users log on and are authenticated, the SSL VPN gateway maintains some authentication and authorization information of the users, and thus different users are differentiated by using the authentication and authorization information of the users in the embodiments of the present invention.

Of course, the SSL VPN gateway functioning as the PE router needs to have functions of both the SSL VPN gateway and the PE router, and thus the SSL VPN gateway also needs to perform conversion between SSL messages and MPLS messages, and needs to allow the remote access to the MPLS VPN by using one of or any combination of three access modes of the SSL VPN.

The embodiment of the present invention provides a method for remotely accessing an MPLS VPN, and the method includes the following steps.

A: multiple virtual interfaces are established in an SSL VPN gateway, one VPN is bound with one virtual interface, and VPN instances are formed according to the virtual interfaces bound with the VPNs. The VPNs bound with the virtual interfaces are MPLS VPNs. The two kinds of VPNs will not be differentiated hereinafter and are called by a joint name VPNs. Different VPN users are differentiated according to authentication and authorization information of the users, so that SSL VPN users are differentiated and directed to different MPLS VPNs. And then the authentication and authorization information of a user is bound with a corresponding VPN.

B: a user x performs information interaction with the SSL VPN gateway, and establishes a connection related to the remote access.

C: the SSL VPN gateway receives a packet sent by the user x through an SSL connection, adds a VPN label and an MPLS forwarding label to the received packet according to a VPN instance bound with the authentication and authorization information of the user x, and sends the packet to a VPN resource server through an MPLS network.

D: the SSL VPN gateway receives a response packet from the VPN resource server, searches for a VPN instance according to a VPN label carried by the response packet, and forwards the response packet to the user x through the SSL connection according to the found VPN instance.

As can be seen from the above, in the embodiments of the present invention, the virtual interfaces are established and are respectively bound with the VPNs, and each VPN is bound with one virtual interface so that the VPN instances corresponding to different VPNs are formed and are used when the packets are forwarded. In the embodiments of the present invention, because the SSL VPN gateway provides only one physical interface for the users, by incorporating characteristics of the SSL VPN gateway, the authentication and authorization information of the users is used to differentiate different VPN users, so that the users can be differentiated when the SSL VPN gateway provides only one physical interface for the users. Further, packets can be forwarded by using corresponding VPN instances, and thereby the remote user can access the VPN resource in the MPLS VPN.

The present invention is described with reference to accompanying drawings and embodiments. In the embodiments below, different VPN users are differentiated by user groups which are indicated in the authentication and authorization information and which users belong to. In practical network, there are users who do not belong to any VPN, called public users, this kind of users can also be differentiated by using, for example, the user groups indicated in the authentication and authorization information. In other embodiment, different VPN users may be differentiated by using one or any combination of the user groups, virtual areas and roles indicated in the authentication and authorization information.

In the embodiment, the MPLS VPN and the SSL VPN should be configured firstly. Related configurations of the MPLS VPN are the same as those of regular MPLS VPNs, and will not be described herein. Related configurations of the SSL VPN include the following steps.

1: multiple address pools are established in the SSL VPN gateway, each address pool corresponds to one VPN; the address pools are used only in the IP access mode.

2: one virtual interface is established for each address pool, an address pool and its corresponding virtual interface belong to the same network segment, and each virtual interface is bound with one VPN. The virtual interface may be an SSL VPN Virtual Ethernet (SVE) interface, called virtual interface for short, or may be a Loopback interface. In the embodiment, the SVE interface is taken as an example.

3: a VPN instance corresponding to each VPN is formed according to the virtual interface bound with the VPN. Each VPN instance includes a routing forwarding table and an MPLS label forwarding table.

The routing forwarding table includes two kinds of routes, one is for indicating an exit interface through which a packet received from the VPN resource servers is to be forwarded, and the other is for indicating an exit interface through which a packet received from the users is to be forwarded. The first kind of routes include two routes. One is used in the TCP/WEB access mode, and the other route is used in the IP access mode, which will be described in detail below.

The MPLS label forwarding table includes two kinds of table entries, one is a mapping relation between VPNs and VPN labels (inner layer labels), and the other is for indicating next hop P router information and an MPLS forwarding label for a packet received from the users.

4: the virtual interface is authorized to the user. In the embodiments of the present invention, the authorization operation is to bind the virtual interface with the user group. Because the virtual interface is bound with the VPN in step 2, the user group, the virtual interface and the VPN instance are in a binding relation after step 4. Regarding which virtual interface is bound with which user group, it should be determined according to the VPN resource which the user group is allowed to access. For example, a user group 1 is allowed to access resources in VPN1, and then a virtual interface corresponding to the VPN1 is bound with the user group 1. Those skilled in the art can easily understand the forming of the binding relation.

After the configurations in the above steps, a User to VPN relation table (UVR) shown in table 1 is formed, which records which user corresponds to which VPN and which virtual interface is bound with the VPN.

TABLE 1

| user | User group | Virtual interface | Bound VPN instance (label index of VPN instance) |
|---|---|---|---|
| user1 | Vpn1group | SVE1/0 | VPN1(VPN1 label index: 1) |
| user2 | Vpn2group | SVE1/1 | VPN2(VPN2 label index: 2) |
| user3 | Pubgroup | none | PUBLIC(0) |

As shown in Table 1, the UVR table includes the following fields: a user ID, a user group, a virtual interface, a bound VPN instance. The field of the bound VPN instance in table 1 further includes an index of a VPN label. Table 1 is the UVR table formed according to the networking structure shown in FIG. 3. A user1 belongs to a user group Vpn1group, the user group Vpn1group is bound with a virtual interface SVE1/0, the VPN instance bound with the SVE1/0 is a VPN1 instance, and the label index of the VPN1 instance is 1. A user2 is similar to the user1. A user3 is a common user and does not belong to any VPN. Thus, as shown in the UVR table, the user3 belongs to a public user group (Pubgroup), and no virtual interface or VPN instance is bound with the Pubgroup, thus the field of the bound VPN instance records, for example, PUBLIC(0).

After the configurations in the above steps, the VPN instances corresponding to different VPNs are formed in the SSL VPN gateway. The VPN instances corresponding to the VPN1 and the VPN2 are taken as an example. In the VPN instances described below, only the fields closely related to the embodiments of the present invention are listed and unrelated fields are omitted.

Firstly, the routing forwarding table of the VPN includes:

| vpn1 Route Information | | |
|---|---|---|
| Destination/Mask | Nexthop | Interface |
| Routing Table: vpn1 Route-Distinguisher: 100: 1 | | |
| 10.1.1.0/24 | 10.1.1.1 | SVE1/0 |
| 10.1.1.1/32 | 127.0.0.1 | InLoopBack0 |
| VPN Routing Table: Route-Distinguisher: 100: 3 | | |
| 10.3.1.0/24 | 3.3.3.9 | InLoopBack0 |

| vpn2 Route Information | | |
|---|---|---|
| Destination/Mask | Nexthop | Interface |
| Routing Table: vpn2 Route-Distinguisher: 100: 2 | | |
| 10.2.1.0/24 | 10.2.1.1 | SVE1/1 |
| 10.2.1.1/32 | 127.0.0.1 | InLoopBack0 |
| VPN Routing Table: Route-Distinguisher: 100: 4 | | |
| 10.4.1.0/24 | 3.3.3.9 | InLoopBack0 |

In the routing forwarding table of the VPN1, contents of the Routing Table are the first kind of routes, and this kind of routes includes two routes.

A destination address of the first route is the virtual interface SVE1/0 bound with the VPN1 and the network segment which the address pool belongs to, 10.1.1.0/24, and a next hop of the first route is an IP address of the virtual interface SVE1/0, 10.1.1.1.

This route is applicable to the IP access mode. When a packet received from the VPN resource server matches 10.1.1.0/24, the next hop is determined as 10.1.1.1, i.e. the virtual interface SVE1/0, and then the packet is directly forwarded through the virtual interface SVE1/0. How to use this route in the IP access mode will be described hereinafter.

A destination address of the second route is an IP address of the virtual interface SVE1/0 bound with the VPN1, 10.1.1.1/32, and a next hop of the second route points to an InLoop-Back0 interface address 127.0.0.1.

This route is applicable to the TCP/WEB access mode. When a packet received from the VPN resource server matches the IP address of the SVE1/0, 10.1.1.1/32, the next hop is determined as 127.0.0.1, i.e. the packet destines locally, and then an IP layer directly forwards the packet to the SSL VPN service module in an application layer through a TCP layer to be processed and forwarded. How to use this route in the TCP/WEB access mode will be described hereinafter.

In the routing forwarding table of the VPN1, contents of the VPN Routing Table are the second kind of routes. The second kind of routes include such a route: a destination address of the route is the network segment which the VPN resource server belongs to, 10.3.1.0/24, and a next hop of the route is an address of an opposite PE device connected with the SSL VPN gateway through a BGP connection, where 3.3.3.9 is a loopback interface address of the opposite PE device. This route is applicable to any access mode. When a packet received from the user matches 10.3.1.0/24, the next hop is determined as 3.3.3.9.

Configurations of the VPN routing forwarding table of the VPN2 are similar to those of the VPN1, and will not be described in detail again.

Secondly, the MPLS label forwarding table of the VPN includes:

| Vpn-instance Name: vpn1 Route Distinguisher: 100: 1 | | | |
|---|---|---|---|
| NO | FEC (forwarding equivalence class) | NEXTHOP | OUTER-LABEL |
| 1 | 10.3.1.0/24 | 172.1.1.2 | 1026(vpn) |

| Vpn-instance Name: vpn2 Route Distinguisher: 100: 2 | | | |
|---|---|---|---|
| NO | FEC | NEXTHOP | OUTER-LABEL |
| 1 | 10.4.1.0/24 | 172.1.1.2 | 1026(vpn) |
| NO | VRFNAME | INNER-LABEL(inner label) | |
| 1 | vpn1 | 1024 | |
| 2 | vpn2 | 1025 | |

In the MPLS label forwarding table of the VPN1, contents of VRFNAME and INNER-LABEL record the VPN label of each VPN.

Contents of Vpn-instance Name are a forwarding table entry, a Forwarding Equivalent Class (FEC) of the forwarding table entry is the network segment 10.3.1.0/24 which the VPN resource server belongs to, and a next hop of the forwarding table entry is an IP address of the first P router through which a path from the SSL VPN gateway to the VPN resource server passes, 172.1.1.2. The forwarding table entry is applicable to any access mode, when a packet from a user matches 10.3.1.0/24, the next hop is determined as 172.1.1.2, so that the packet is forwarded to a correct P router.

Based on the above UVR and VPN instances, remote access processes in the TCP/WEB access mode and the IP access mode are respectively described with reference to the embodiments.

First Embodiment

In this embodiment, a remote user user1 accesses an MPLS VPN through an SSL connection in the TCP/WEB access mode. It is supposed that a public network IP address of a remote host used by the user1 is 60.191.123.8, that a public network IP address of an SSL VPN gateway is 220.189.204.90, that a private IP address of a virtual interface SVE1/0 bound with VPN1 in the SLL VPN gateway is 10.1.1.1, and that a network segment where a VPN resource that the user1 is allowed to access is located is 10.3.1.0/24. For description convenience, the address of the remote host used by the user1 is called the address of the user, and operations performed by the user through the remote host are all regarded as operations of the user.

Figure 4:
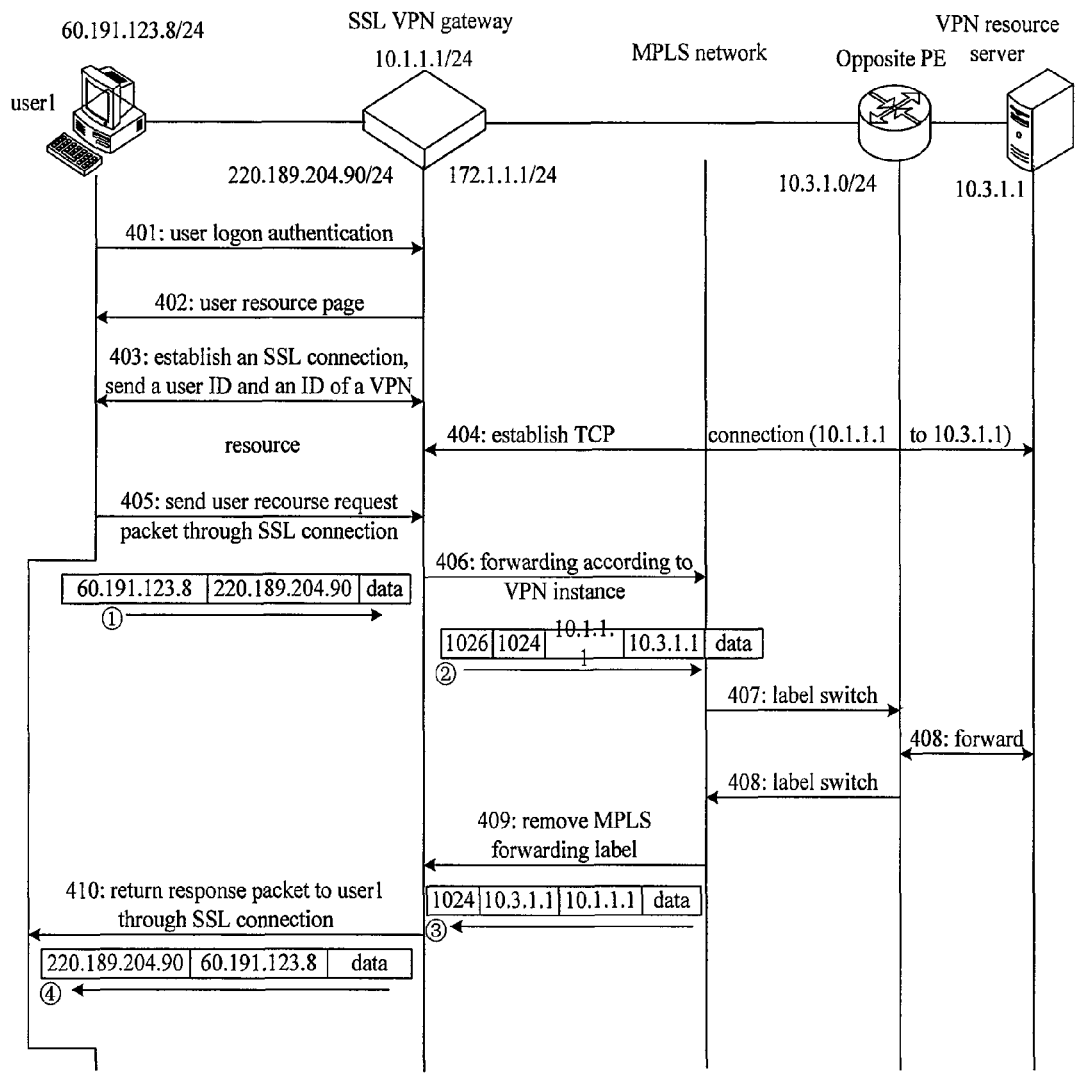
FIG. 4 is a flowchart illustrating accessing an MPLS VPN by a remote user through an SSL connection in a TCP/WEB access mode according to a first embodiment of the present invention.

FIG. 4 is a flowchart of accessing an MPLS VPN by a remote user through an SSL connection in a TCP/WEB access mode according to a first embodiment of the present invention. As shown in FIG. 4, the accessing includes the following.

Step 401: a user1 sends a logon and authentication request to an SSL VPN gateway.

Step 402: the SSL VPN gateway receives the logon and authentication request from the user1, performs logon and authentication processing for the user1; after the user1 passes the authentication, the SSL VPN gateway determines a VPN to which the user1 belongs according to a user group to which the user1 belongs, and then returns a user resource page to the user1. The user resource page includes VPN resource information that the user1 is allowed to access.

In the embodiment, the user1 belongs to a user group Vpn1group, and thus the user1 belongs to the VPN1.

In this step, determining the VPN to which the user1 belongs according to the user group to which the user1 belongs may be implemented by using common modes in conventional SSL VPN technologies or by using the UVR table configured in the present invention.

Step 403: when the user1 requests accessing a VPN resource server, an SSL connection is established between the user1 and the SSL VPN gateway, and the user1 sends a user ID and a VPN resource ID requested to be accessed to the SSL VPN gateway through the SSL connection established.

Step 404: the SSL VPN gateway determines an IP address of the VPN resource server to which the VPN resource requested to be accessed belongs according to the VPN resource ID sent by the user1, and the IP address is supposed to be 10.3.1.1; meanwhile, the SSL VPN gateway searches out a virtual interface SVE1/0 bound with the Vpn1group of the user1 from the UVR table, establishes a TCP connection between the virtual interface SVE1/0 (10.1.1.1) and the VPN resource server requested to be accessed (10.3.1.1), and maintains a bidirectional connection relation table which is called an SSL-TCP (ST) table for short. During the process of establishing the TCP connection, a VPN instance label index corresponding to a Socket of the TCP connection is configured.

Specifically, after determining the IP address of the VPN resource server to which the VPN resource requested to be accessed belongs, the SSL VPN gateway searches the UVR table for a VPN instance to which the user1 belongs, the VPN instance being VPN1, adds a VPN instance label index 1 for the socket, and then initiates a TCP connection to 10.3.1.1. A TCP module in the TCP layer may add the VPN instance label index 1 to a TCP connection request packet according to the VPN instance label index of the socket. The operation of adding the VPN instance label index to the packet is to record the VPN instance label index in packet attributes, rather than to add the VPN instance label index in front of an IP packet. However, in an MPLS module, two layers of labels are added in front of the IP packet.

Afterwards, an IP module searches out a corresponding VPN1 instance according to the VPN instance label index 1 of the packet, searches for a forwarding path according to a destination address 10.3.1.1 in the found VPN1 instance, determines that the packet is to be forwarded by the MPLS, and sends the packet to the MPLS module. The MPLS module searches out a VPN label 1024 of the VPN1 according to the VPN instance label index 1 of the packet, performs matching in an MPLS label forwarding table of the VPN1 instance according to the VPN instance label index 1 and the destination address of the packet, 10.3.1.1, and obtains an MPLS label forwarding table entry in which the FEC of the VPN1 instance is 10.3.1.0/24. And thus, a next hop and an MPLS forwarding label 1026 are obtained. At this moment, the MPLS module adds the VPN label 1024 and the MPLS forwarding label 1026 to the TCP connection request packet, sends the packet to an opposite resource server according to the next hop. The interface bound with the VPN instance is SVE1/0, and thus a source address of a newly-established TCP connection is the IP address of the SVE1/0, a destination address is 10.3.1.1. Packets sent subsequently by the user1 will be sent through the TCP connection.

Step 405: the user1 sends a user resource request packet to the SSL VPN gateway through the SSL connection. The user resource request packet is shown as a packet ① in FIG. 4, and the packet ① includes a public network IP header, a TCP header and a data part. In order to focus on changes in the packet between the Internet and the MPLS network, descriptions of the TCP header is omitted, which do not affect description of the forwarding process.

Herein, a source address and a destination address of the public network IP header respectively are a public network IP address of the user1, 60.191.123.8, and a public network IP address of the SSL VPN gateway, 220.189.204.90.

Step 406: when receiving the user resource request packet sent by the user1 through the SSL connection, the SSL VPN gateway determines to directly forward the user resource request packet through the TCP connection established for the user1. The TCP layer adds the VPN instance label index to the packet according to information of the TCP connection established for the user1; then, according to the VPN instance label index of the packet, the MPLS module adds the VPN label 1024 and the MPLS forwarding label 1026 which is needed when forwarding the packet, and forwards the packet.

This step is implemented through cooperation of multiple modules in the SSL VPN gateway. The multiple modules include a TCP/WEB access mode processing module and a VPN label processing module which are located at an application layer, the TCP module located at the TCP layer, an IP module located at the IP layer, and the MPLS module located between the IP layer and a network interface. The TCP/WEB access mode processing module establishes and maintains the ST table when connections related to the remote access are established. Specifically, the step 406 includes the following sub-steps.

c1: after the packet enters the SSL VPN gateway through the SSL connection between the SSL VPN gateway and the user1, the IP module removes the public network IP header and sends the data part of the packet to the TCP/WEB access mode processing module through the TCP module.

c2: according to the ST table, the TCP/WEB access mode processing module determines to forward the received packet through the TCP connection established for the user1, and sends the packet to the TCP module.

c3: the TCP module adds a private network IP header to the packet according to information of the TCP connection established, adds the VPN instance label index to the packet according to the VPN instance label index of the socket, and sends the packet to the IP module. Herein, a private network source address and a private network destination address of the private network IP header are addresses of two ends of the TCP connection respectively, i.e. the private network source address is the IP address of the virtual interface SVE1/0, 10.1.1.1, and the private network destination address is the IP address of the VPN resource server requested to be accessed by the user1, 10.3.1.1.

c4: the IP module searches out the corresponding VPN instance according to the VPN instance label index of the packet, searches for a forwarding path in the found VPN instance, determines that the packet is to be forwarded by the MPLS, and then forwards the packet to the MPLS module.

c5: the MPLS module searches for the corresponding VPN instance according to the VPN instance label index carried by the packet, adds the VPN label and the MPLS forwarding label to the packet according to the found VPN instance, and forwards the packet. Specifically, the MPLS module learns that the packet belongs to the VPN1 according to the VPN instance label index 1 carried by the packet, obtains the VPN label 1024 from the VPN1, and performs matching in the MPLS label forwarding table according to the private network destination address of the packet. Herein, the private network destination address is 10.3.1.1 and matches with a forwarding table entry in which the FEC is 10.3.1.0/24. And thus the next hop 172.1.1.2 and the MPLS forwarding label 1026 are obtained. Further, the MPLS module adds the VPN label 1024 and the MPLS forwarding label 1026 to the packet, and sends the packet to a correct P route device according to the next hop 172.1.1.2.

After the processing of step 406, the packet ①in FIG. 4 is converted to a packet ②. The packet ②includes the MPLS forwarding label, the VPN label, the private network IP header and the data part. Herein, the VPN label is an inner label used for differentiating the VPN to which the packet belongs, and the MPLS label is an outer label used for forwarding in the MPLS network.

Step 407: the MPLS network forwards the packet to an opposite PE router according to the MPLS forwarding label carried by the packet.

Step 408: the opposite PE router forwards the packet to the VPN resource server and returns a response packet of the VPN resource server to the MPLS network.

Step 409: a P router adjacent to the SSL VPN gateway removes an MPLS forwarding label of the response packet, and sends the response packet to the SSL VPN gateway. The response packet sent to the SSL VPN gateway is shown as a packet ③in FIG. 4. The packet ③includes the VPN label, the private network IP header and the data part. Herein, the private network source address and destination address in the private network IP header are 10.3.1.1 and 10.1.1.1 respectively, and the VPN label is 1024.

Step 410: the SSL VPN gateway searches for a corresponding VPN instance according to the VPN label carried by the response packet, performs matching in the found VPN instance according to the private network destination address of the response packet to obtain a second routing forwarding table entry in the above VPN1 instance, and obtains a next hop which is an inner loopback interface address, 127.0.0.1, and then directly forwards the received response packet to an upper layer application, i.e. to the TCP/WEB access mode processing module in the application layer. After finishing the processing, the TCP/WEB access mode processing module forwards the response packet to the user1 through the SSL connection between the TCP/WEB access mode processing module and the user1.

Specifically, step 410 includes the following sub-steps.

d1: after the response packet enters the SSL VPN gateway through the TCP connection established for the user1, the MPLS module determines that the response packet belongs to the VPN1 according to the VPN label 1024 carried by the response packet, and then sends information of the VPN1 and the response packet without the VPN label to the IP module.

d2: the IP module obtains the VPN1 instance according to the information of the VPN1 to which the response packet belongs, and performs matching according to the private network destination address of the response packet 10.1.1.1. Detailed contents of the VPN1 instance have already been described before. Herein a routing forwarding table entry in which the destination address is 10.1.1.1/32 in the VPN1 instance is obtained through the matching. The IP module obtains a next hop which is an inner loopback interface address 127.0.0.1 from the routing forwarding table entry obtained through the matching, then directly forwards the response packet without the private network IP header to the TCP/WEB access mode processing module in the application layer through the TCP module.

d3: according to the ST table, the TCP/WEB access mode processing module determines that the response packet received from the TCP connection is to be forwarded to the user1 through the SSL connection, and forwards the response packet to the TCP module.

d4: the TCP module adds the public network IP header to the response packet according to the information of the SSL connection, and forwards the response packet to the IP module.

d5: the IP module searches for a public network route according to the destination address, so as to forward the response packet to the user1 through the SSL connection. The response packet sent to the user1 is shown as a packet ④in FIG. 4. The packet ④includes the public network IP header and the data part.

Thus, the process is finished.

Second Embodiment

In this embodiment, a remote user, user1, accesses an MPLS VPN through an SSL connection in the IP access mode. It is supposed that a public network IP address of a remote host used by the user1 is 60.191.123.8, that a public network IP address of an SSL VPN gateway is 220.189.204.90, that a private IP address of a virtual interface SVE1/0 bound with VPN1 in the SSL VPN gateway is 10.1.1.1, and that a network segment which a VPN resource that the user1 is allowed to access belongs to is 10.3.1.0/24.

Figure 5:
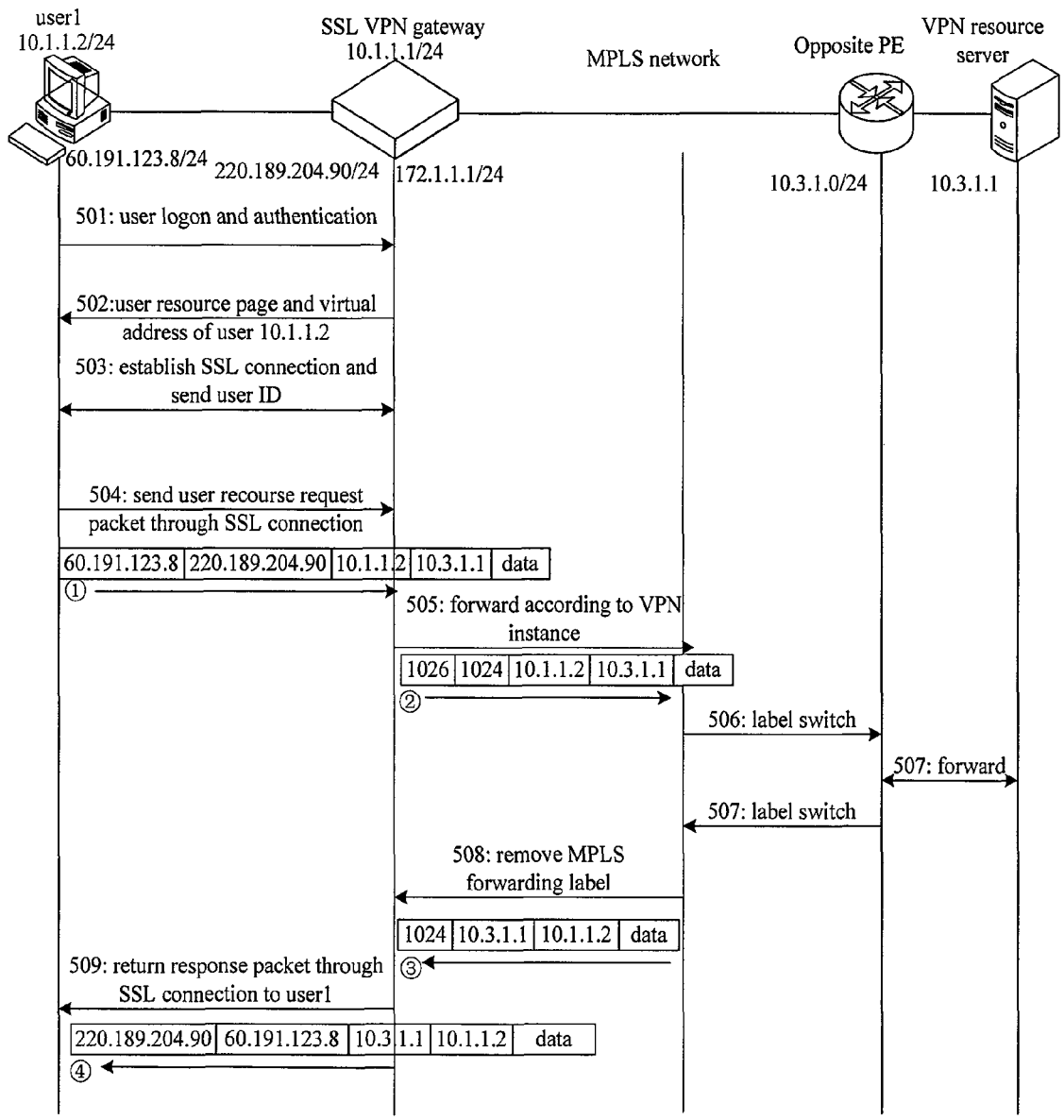
FIG. 5 is a flowchart illustrating accessing an MPLS VPN by a remote user through an SSL connection in an IP access mode according to a second embodiment of the present invention.

FIG. 5 is a flowchart illustrating accessing an MPLS VPN by a remote user through an SSL connection in an IP access mode according to a second embodiment of the present invention. As shown in FIG. 5, the method includes the following steps.

Step 501: a user1 sends a logon and authentication request to an SSL VPN gateway.

Step 502: the SSL VPN gateway receives the logon and authentication request from the user1, performs logon and authentication processing for the user1; after the user1 passes the authentication, the SSL VPN gateway determines that the user1 belongs to VPN1 according to a user group Vpn1group which the user1 belongs to, and then returns a user resource page to the user1. In addition, the SSL VPN gateway randomly allocates one IP address to the user1 from an address pool configured for the VPN which the user1 belongs to, and the IP address is the virtual address of the user1. In the embodiment, it is supposed that the virtual address allocated to the user1 is 10.1.1.2.

Step 503: an SSL connection is established between the user1 and the SSL VPN gateway when the user1 requests accessing a VPN resource server; in the IP access mode, the SSL VPN gateway needs to maintain a relation table of users, virtual addresses and SSL connections, which is called a User-Virtual IP-SSL (UVS) table. Since the gateway does not need to maintain the connection between the gateway and the VPN resource server in the IP access mode, the user1 only needs to send a user ID to the SSL VPN gateway through the SSL connection established.

Step 504: the user1 sends a user resource request packet to the SSL VPN gateway through the SSL connection. The user resource request packet is shown as a packet ① in FIG. 5, different from the first embodiment, the packet ① includes not only a public network IP header and data part, but also a private network IP header (the TCP header is also omitted).

Herein, a source address and a destination address of the public network IP header are respectively a public network IP address of the user1, 60.191.123.8, and a public network IP address of the SSL VPN gateway, 220.189.204.90; a source address and a destination address of the private network IP header are respectively the virtual address of the user1, 10.1.1.2, and the private network IP address of the VPN resource server requested to be accessed, 10.3.1.1.

Step 505: when receiving the user resource request packet sent by the user1, the SSL VPN gateway determines that the packet is from the user1 according to the UVS table, and further determines the VPN which the user1 belongs to by searching the UVS table. In the IP layer, a VPN instance label index is added to the packet according to a VPN instance of the VPN which the user1 belongs to; and then an MPLS module adds a VPN label and an MPLS forwarding label according to the VPN instance label index of the packet, and forwards the packet. The forwarding in this step is MPLS forwarding concurrent with common IP forwarding.

This step is implemented through cooperation of multiple modules in the SSL VPN gateway. The multiple modules include an IP access mode processing module 1 located at an application layer, an IP access mode processing module 2 located at the IP layer, a TCP module located at a TCP layer, and the MPLS module located between the IP layer and a network interface. The IP access mode processing module 1 located at the application layer maintains the SSL connection and the UVS table, the IP access mode processing module 2 located at the IP layer processes the forwarding. The IP access mode processing modules 1 and 2 are actually one module operating at the application layer and the IP layer simultaneously, and are called two modules for understanding convenience. The two modules share data. Thus, when data arrives at the IP access mode processing module 1, it also arrives at the IP access mode processing module 2, and vice versa. Specifically, the step 505 includes the following sub-steps.

c1: after the packet enters the SSL VPN gateway through the SSL connection between the SSL VPN gateway and the user1, the IP module removes the public network IP header and sends the packet with the private network IP header and the data part to the IP access mode processing module 1 through the TCP module; the IP access mode processing module 1 sends the packet to the IP access mode processing module 2.

c2: the IP access mode processing module 2 determines that the packet is from the user1 by searching the UVS table, and further determines to forward the packet in a direct IP forwarding mode; the packet is then sent to a VPN label processing module in the IP layer.

c3: by searching the UVS table, the VPN label processing module determines that the Vpn1grougp of the user1 is bound with a VPN1 instance and learns that the VPN instance label index of the VPN1 instance is 1; then, adds the VPN instance label index 1 to the IP packet obtained by parsing, and forwards the packet to the IP module.

c4: the IP module performs route searching according to the destination address of the packet, determines that the packet is to be forwarded by the MPLS, and forwards the packet to the MPLS module.

c5: the MPLS module searches for a corresponding VPN instance according to the VPN instance label index carried by the packet, adds a VPN label and an MPLS forwarding label to the packet according to the found VPN instance, and forwards the packet. This step is the same as step c5 in the first embodiment.

After the processing in step 505, the packet ① in FIG. 5 is converted to a packet ②. The packet ② includes the MPLS forwarding label, the VPN label, the private network IP header and the data part. Different from the first embodiment, the private network source address in the packet ② of this embodiment is the virtual address of the user1, 10.1.1.2.

Step 506: the MPLS network forwards the packet to an opposite PE router according to the MPLS forwarding label carried by the packet.

Step 507: the opposite PE router forwards the packet to the VPN resource server and returns a response packet of the VPN resource server to the MPLS network.

Step 508: a P router adjacent to the SSL VPN gateway removes an MPLS forwarding label of the response packet, and sends the response packet to the SSL VPN gateway. The response packet sent to the SSL VPN gateway is shown as a packet ③ in FIG. 5. The packet ③ includes the VPN label, the private network IP header and the data part. Herein, the private network source address and destination address in the private network IP header are respectively 10.3.1.1 and 10.1.1.2, and the VPN label is 1024.

Step 509: the SSL VPN gateway searches for a corresponding VPN instance according to the VPN label carried by the response packet, performs matching in the found VPN instance according to the private network destination address 10.1.1.2 of the response packet to obtain a first routing forwarding table entry in the above VPN1 instance and a next hop which is a virtual interface SVE1/0, and then directly forwards the response packet to the user1 through the SSL connection via the SVE1/0.

Specifically, step 509 includes the following sub-steps.

d1: after the response packet enters the SSL VPN gateway, the MPLS module determines that the response packet belongs to the VPN1 according to the VPN label carried by the response packet, and then sends information of the VPN1 which the response packet belongs to and the response packet without the VPN label to the IP module.

d2: the IP module obtains the VPN1 instance according to the information of the VPN1 to which the response packet belongs, and performs routing matching in the VPN1 instance according to the private network destination address 10.1.1.2 of the response packet, and finds a matched routing forwarding table entry in which the destination address is 10.1.1.0/24 in the VPN1 instance; the IP module obtains a next hop which is the IP address 10.1.1.1 of the virtual interface SVE1/0 from the matched routing forwarding table entry; since the destination address is not a local inner interface address, the virtual interface directly forwards the packet after receiving the packet.

d3: the forwarding function of the virtual interface is implemented by the IP access mode processing module 2 located at the IP layer. The IP access mode processing module 2 determines that the response packet is to be forwarded to the user1 through the SSL connection according to the private network destination address, i.e. the virtual address 10.1.1.2 in the response packet, and according to the UVS table; and then forwards the response packet to the IP access mode processing module 1 located at the application layer. The IP access mode processing module 1 sends the packet to the TCP module.

d4: the TCP module adds a public network IP header to the response packet according to the information of the SSL connection, and forwards the response packet to the IP module.

d5: the IP module searches for a public network route, so as to forward the response packet to the user1 through the SSL connection. The response packet sent to the user1 is shown as a packet ④ in FIG. 5. The packet ④ includes the public network IP header, the private network IP header and the data part.

And the process is finished.

The first embodiment is a solution supporting the TCP and/or WEB access mode, and the second embodiment is a solution supporting the IP access mode. Actually, the TCP access mode, the WEB access mode and the IP access mode may coexist, or only two of the three are supported at the same time.

The processing for a public network user, user3, is the same as the processing in the conventional SSL VPN gateway. Specifically, when receiving a user resource request packet of the user3, the SSL VPN gateway searches the UVR table and determines that the user3 belongs to the user group Pubgroup and is not bound with any VPN, and thus determines that a packet of a public user is received and does not add any label, but directly sends the packet to the VPN resource server through a public route, also called a global route. Similarly, when receiving a packet without a VPN label from the VPN resource server, the SSL VPN gateway sends the packet to an upper layer through the global route to be sent through the SSL connection, or directly sends the packet via the virtual interface through the SSL connection.

In order to implement the above methods, embodiments of the present invention provide a gateway. The gateway is applicable to this kind of systems in which a remote user accesses a VPN resource server in an MPLS VPN through an SSL connection between the remote user and the gateway. The gateway also functions as an SSL VPN gateway in an SSL VPN and a PE router in the MPLS VPN. In the embodiment, the gateway is called an SSL VPN gateway.

Figure 6:
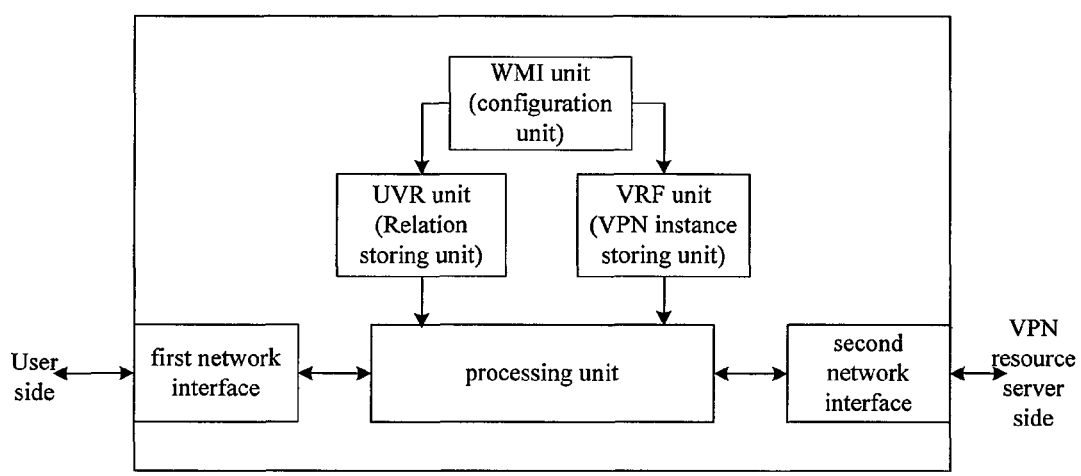
FIG. 6 is a schematic diagram illustrating a structure of an SSL VPN gateway according to an embodiment of the present invention.

FIG. 6 is a schematic diagram illustrating a structure of an SSL VPN gateway according to an embodiment of the present invention. As shown in FIG. 6, the SSL VPN gateway includes a configuration unit (also called a WMI unit), a first network interface, a second network interface, a processing unit, a VPN instance storing unit (also called a VRF unit) and a relation storing unit (also called a UVR unit).

The WMI unit is adapted to establish multiple virtual interfaces, one virtual interface being bound with one VPN and VPN instances being formed according to the virtual interfaces bound with the VPNs; save the VPN instances in the VRF unit; differentiate different VPN users according to authentication and authorization information of the users; bind the authentication and authorization information of the users with corresponding VPNs; and save a binding relation in the UVR unit. When establishing the virtual interfaces, the WMI unit is adapted to establish a virtual interface for an address pool established by each VPN, the address pool and the corresponding VPN belonging to the same network segment and the address pools being used only in the IP access mode.

Preferably, the WMI unit is further adapted to form a UVR table as shown in Table 1 according to various binding relations established, and save the UVR table in the UVR unit. The VPN instances formed by the WMI unit include a routing forwarding table and an MPLS label forwarding table; contents of the two tables are the same as those described in the method embodiments and are not described herein.

The UVR unit is adapted to store the binding relation established by the WMI unit.

The VRF unit is adapted to store the VPN instances.

The first network interface is adapted to provide a data transmission channel between the SSL VPN gateway where the first network interface is located and a user, and couple a remote host through the Internet.

The second network interface is adapted to provide a data transmission channel between the SSL VPN gateway where the second network interface is located and an MPLS network, and couple a VPN resource server through the MPLS network.

The processing unit is adapted to perform information interaction with the user1 and establish connections related to remote access. When receiving a packet sent by the user1 through the SSL connection, the processing unit is adapted to obtain a VPN instance bound with a user group which the user1 belongs to, i.e. a VPN1 instance, from the VRF unit according to the binding relations stored in the UVR unit; add a VPN label 1024 and an MPLS forwarding label 1026 to the packet by using the VPN1 instance; and send the packet to the VPN resource server through the MPLS network. When receiving a response packet from the VPN resource server, the processing unit is adapted to search for a corresponding VPN instance in the VRF unit according to a VPN label 1024 carried by the response packet, and forward the response packet to the user1 through the SSL connection between the processing unit and the user1 according to the found VPN instance.

When the VPN resource server is accessed in the TCP or WEB mode, the processing unit is further adapted to establish an SSL connection between the user1 and the SSL VPN gateway when establishing the connections related to remote access, establish a TCP connection between a virtual interface SVE1/0 and the VPN resource server requested to be accessed for the user1, and maintain an ST table. In the process of establishing the TCP connection, the processing unit is adapted to add a VPN instance label index 1 to a Socket of the established TCP connection according to a VPN instance bound with authentication and authorization information of the user1.

When receiving a packet sent by the user1 through the SSL connection, the processing unit is adapted to add the VPN instance label index 1 to the received packet at the TCP layer according to information of the TCP connection established for the user1. And then an MPLS module in the processing unit is adapted to search out a VPN1 instance according to the VPN instance label index 1, add a VPN label 1024 and an MPLS forwarding label 1026 to the packet according to the VPN instance label index of the packet, and forward the packet to the VPN resource server S1 through the TCP connection established for the user1.

When receiving a response packet through the TCP connection, the processing unit is adapted to search for a corresponding VPN instance according to a VPN label 1024 carried by the response packet, perform matching in the found VPN instance according to the private network destination address 10.1.1.1 of the response packet to obtain a second routing forwarding table entry in the VPN1 instance and a next hop which is an inner loopback interface address 127.0.0.1, and directly forward the response packet received to an upper layer application. And the upper layer application sends the response packet to the user1 through the SSL connection.

When the VPN resource server is accessed in the IP access mode, the WMI unit is further adapted to establish a virtual interface for the address pool established by each VPN when establishing the multiple virtual interfaces. The address pool and the virtual interface corresponding to the address pool belong to the same network segment.

The processing unit is further adapted to allocate one virtual address 10.1.1.2 for the user1 from the address pool configured for the VPN which the user1 belongs to when establishing the connections related to the remote access, and establish the SSL connection between the user1 and the SSL VPN gateway.

The processing unit is further adapted to, when receiving a packet carrying a private network IP header (the private network source address is 10.1.1.2) sent by the user1 through the SSL connection, add the VPN instance label index 1 to the received packet at the IP layer according to the VPN1 instance bound with the user group which the use1 belongs to, and then the MPLS module in the processing unit is adapted to add a VPN label 1024 and an MPLS forwarding label 1026 to the packet according to the VPN instance label index 1.

The processing unit is further adapted to, when receiving a response packet, search for a corresponding VPN instance according to the VPN label 1024 carried by the response packet, perform matching in the found VPN instance according to the private network destination address of the response packet 10.1.1.1 to obtain a first routing forwarding table entry in the VPN1 instance and a next hop which is an IP address 10.1.1.1 of a virtual interface SVE1/0, and forward the response packet to the user1 through the SSL connection by using the virtual interface SVE1/0.

The processing module is described hereinafter in detail.

The processing module includes an SSL VPN service module, a VPN label processing module, a TCP module, an IP module and an MPLS module. The SSL VPN service module includes one or a combination of a TCP/WEB access mode processing module and an IP access mode processing module according to an access mode supported by the SSL VPN gateway.

Figure 7:
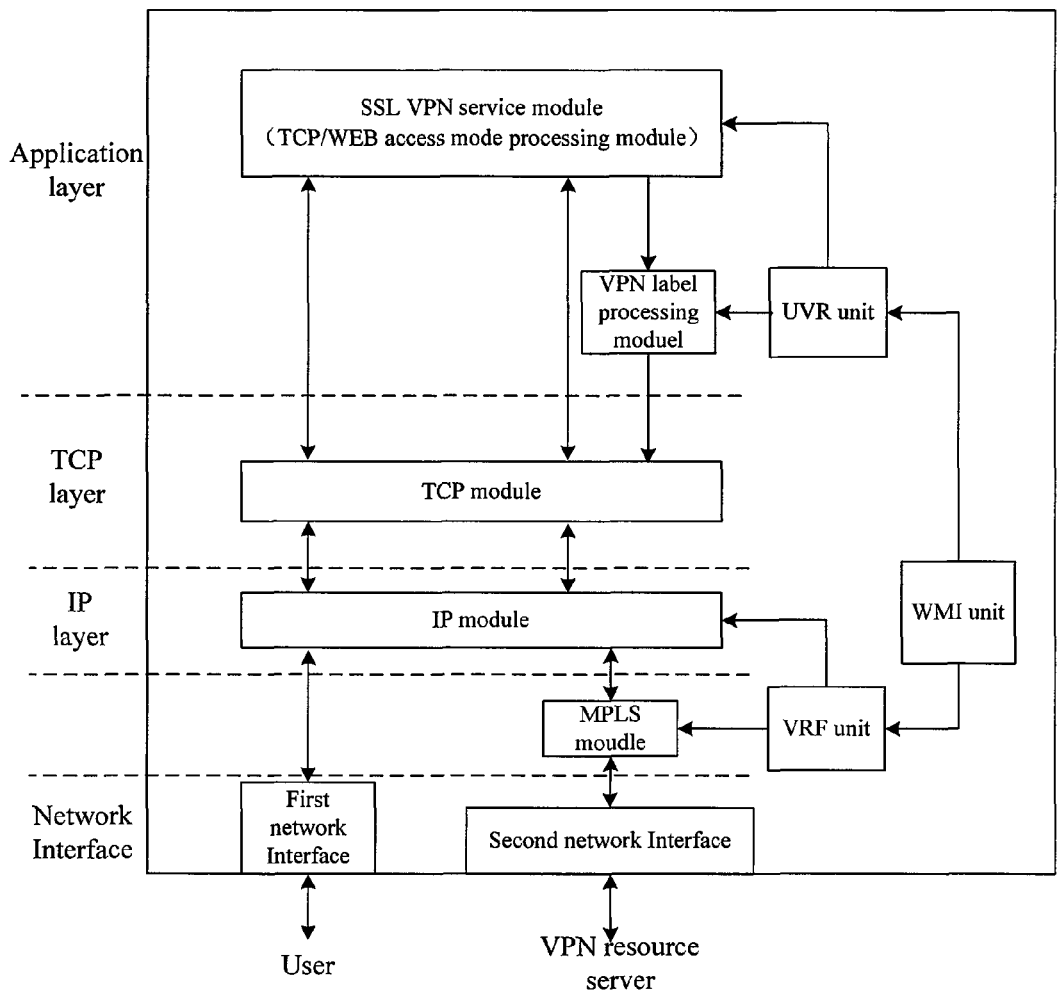
FIG. 7 is a schematic diagram illustrating a structure of an SSL VPN gateway when an access to a VPN resource server is in a TCP/WEB mode according to an embodiment of the present invention.

FIG. 7 is a schematic diagram illustrating a structure of an SSL VPN gateway when a VPN resource server is accessed by using a TCP/WEB mode according to an embodiment of the present invention. As shown in FIG. 7, the processing unit includes a TCP/WEB access mode processing module and a VPN label processing module which are located at an application layer, a TCP module located at a TCP layer, an IP module located at an IP layer, and an MPLS module located between the IP layer and a network interface.

The TCP/WEB access mode processing module is adapted to return a user resource page to the user1 when the user1 requests logon and authentication; when the user1 requests accessing the VPN resource server S1, establish the SSL connection between the user1 and the SSL VPN gateway, establish a TCP connection between the virtual interface SVE1/0 and the VPN resource server S1, and maintain a ST table.

In the process of establishing the TCP connection, the VPN label processing module is adapted to add the VPN instance label index 1 to a socket of the TCP connection according to the VPN1 instance bound with the user group which the user1 belongs to.

After the packet enters the SSL VPN gateway through the SSL connection between the user1 and the SSL VPN gateway, the IP module is adapted to remove the public network IP header of the packet, and send the data part of the packet to the TCP/WEB access mode processing module through the TCP module.

And the TCP/WEB access mode processing module is further adapted to determine to forward the received packet through the TCP connection established for the user1 according to the ST table, and send the packet to the TCP module.

And the TCP module is adapted to add the private network IP header to the packet according to information of the TCP connection established for the user1, add the VPN instance label index 1 to the packet according to the VPN instance label index 1 of the socket, and send the packet to the IP module.

Afterwards, the IP module is adapted to perform route searching, i.e. search out a corresponding VPN1 instance according to the VPN instance label index 1 of the packet, search for a forwarding path in the VPN routing table and the label forwarding table so as to determine that the packet is to be forwarded by the MPLS, and send the packet to the MPLS module.

The MPLS module is adapted to search out a corresponding VPN1 instance in the VRF unit according to the VPN instance label index 1 carried by the packet, add the VPN label 1024 and the MPLS forwarding label 1026 to the packet according to the found VPN1 instance, and forward the packet.

After the response packet enters the SSL VPN gateway through the TCP connection between the VPN resource server S1 and the SSL VPN gateway, the MPLS module is adapted to determine the VPN to which response packet belongs according to the VPN label 1024 carried by the response packet, and send information of the VPN1 which the response packet belongs to and the response packet without the VPN label to the IP module.

The IP module is adapted to obtain the corresponding VPN instance from the VRF unit according to the information of the VPN which the response packet belongs to, perform matching in the VPN1 instance according to the private network destination address 10.1.1.2 of the response packet to obtain a second routing forwarding table entry in the VPN1 instance and a next hop which is an inner loopback interface address 127.0.0.1, and directly forward the response packet without the private network IP header to the TCP/WEB access mode processing module through the TCP module.

The TCP/WEB access mode processing module is adapted to determine according to the ST table that the response packet received through the TCP connection is to be forwarded to the user1 through the SSL connection, and forward the response packet to the TCP module. The TCP module is adapted to add the public network IP header to the response packet according to the information of the SSL connection, and forward the response packet to the IP module. The IP module is adapted to search for the public network route and forward the response packet to the user1.

Figure 8:
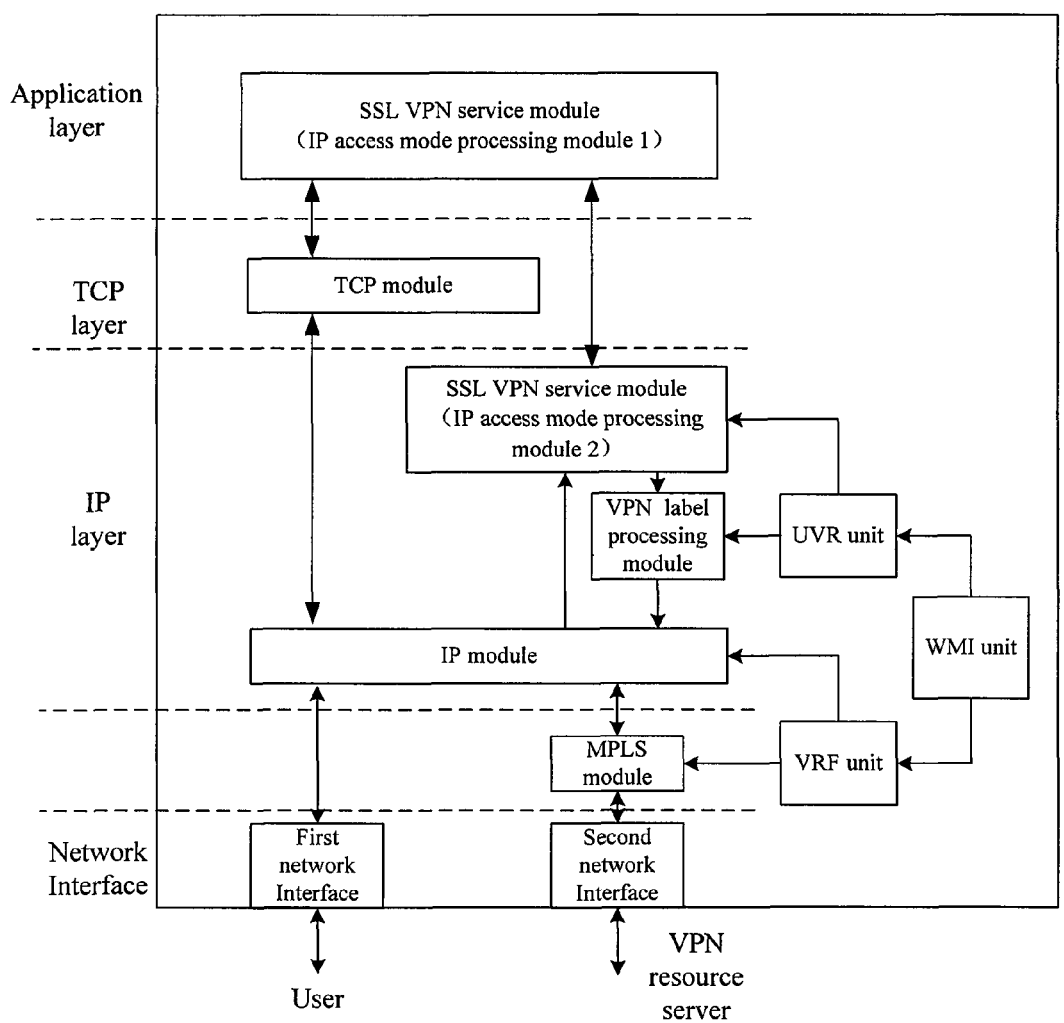
FIG. 8 is a schematic diagram illustrating a structure of an SSL VPN gateway when an access to a VPN resource server is in an IP mode according to an embodiment of the present invention.

FIG. 8 is a schematic diagram illustrating a structure of an SSL VPN gateway when a VPN resource server is accessed by using an IP mode according to an embodiment of the present invention. As shown in FIG. 8, the processing unit includes an IP access mode processing module 1 located at an application layer, an IP access mode processing module 2 and a VPN label processing module which are located at an IP layer, a TCP module located at a TCP layer, an IP module located at an IP layer and an MPLS module located between the IP layer and a network interface.

The IP access mode processing module 1 is adapted to return a user resource page to the user1 when the user1 requests logon and authentication, and allocate one virtual address 10.1.1.2 for the user1 from an address pool configured for a VPN to which the user1 belongs; when the user1 requests accessing a VPN resource server, establish an SSL connection between the user1 and the SSL VPN gateway, and maintain a UVS table. The UVS table is shared with the IP access mode processing module 2.

After the packet enters the SSL VPN gateway through the SSL connection between the user1 and the SSL VPN gateway, the IP module is adapted to remove a public network IP header of the packet, and send the packet containing the private network IP header and the data part to the IP access mode processing module 1 located at the application layer through a TCP module. The IP access mode processing module 1 sends the packet to the IP access mode processing module 2 located at the IP layer. A private network source address is a virtual address of the user1, 10.1.1.2.

The IP access mode processing module 2 is adapted to determine, according to the UVS table, to forward the packet in a direct IP forwarding mode, and send the packet to the VPN label processing module.

The VPN label processing module is adapted to determine that a VPN bound with a user group to which the user1 belongs is a VPN1 according to a binding relation stored in the UVR unit, add a VPN instance label index 1 to the packet, and send the packet to the IP module.

The IP module is adapted to determine, by using route searching, that the packet is to be forwarded by MPLS; and send the packet to the MPLS module.

The MPLS module is adapted to search for a corresponding VPN instance according to the VPN instance label index 1 carried by the packet, add a VPN label 1024 and an MPLS forwarding label 1026 to the packet according to the found VPN1 instance, and send the packet.

After a response packet enters the SSL VPN gateway through a second network interface, the MPLS module is adapted to determine a VPN to which the response packet belongs according to a VPN label 1024 carried by the response packet, and send information of the VPN which the response packet belongs to and the response packet without the VPN label to the IP module.

The IP module is adapted to obtain a corresponding VPN instance from the VRF unit according to the information of the VPN which the response packet belongs to; perform route matching according to a private network destination address of the response packet, i.e. according to the virtual address of the user1, to obtain a first routing forwarding table entry in the VPN1 instance and a next hop which is SVE1/0; and forward the response packet to the virtual interface SVE1/0 according to the first routing forwarding table entry. The forwarding function of the virtual interface SVE1/0 is implemented by the IP access module processing module 2 located at the IP layer, i.e. the response packet is forwarded to the IP access module processing module 2.

The IP access mode processing module 2 is adapted to determine to forward the response packet via the virtual interface SVE1/0 through the SSL connection with the user1 according to the UVS table, and send the response packet to the TCP module.

The TCP module is adapted to add a public network IP header to the response packet according to information of the SSL connection, and send the response packet to the IP module.

The IP module is adapted to send the response packet to the user1 by searching for a public network route.

The present invention further provides a system for remotely accessing an MPLS VPN. As shown in FIG. 3, the system includes a remote host used by a user, an Internet, an SSL VPN gateway, an MPLS VPN and a VPN resource server in the MPLS VPN. The remote host remotely accesses the VPN resource server in the MPLS VPN through the SSL connection between the remote host and the SSL VPN gateway. The SSL VPN gateway also functions as a PE router of the MPLS VPN and may be any kind of SSL VPN gateways described in the above embodiments.

The foregoing is only the preferred embodiments of the present invention and is not intended to limit the scope of the present invention. Any modification, equivalent substitution, or improvement made without departing from principle of the present invention should be covered by the scope set forth in the appended claims.

The invention claimed is:

1. A method for remotely accessing a Multi-Protocol Label Switching Virtual Private Network (MPLS VPN), wherein a remote user accesses a VPN resource server in the MPLS VPN through a Secure Socket Layer (SSL) connection between the remote user and an SSL VPN gateway, the SSL VPN gateway also functions as a Provider Edge (PE) router in an MPLS network, and packets received by the SSL VPN gateway from the VPN resource server or transmitted by the SSL VPN gateway to the VPN resource server are transmitted through the MPLS network, the method comprising:

A: establishing multiple virtual interfaces in the SSL VPN gateway, one virtual interface being bound with one VPN, and forming VPN instances according to the virtual interfaces bound with VPNs, differentiating different VPN users according to authentication and authorization information of users, and binding the authentication and authorization information of the users with VPNs respectively;

B: performing, by a user, information interaction with the SSL VPN gateway, and establishing a connection related to a remote access;

C: receiving, by the SSL VPN gateway, a packet sent by the user through the SSL connection, adding a VPN label and an MPLS forwarding label to the packet according to a VPN instance bound with authentication and authorization information of the user, and sending the packet to the VPN resource server through the MPLS network; wherein the packet is a resource request packet;

D: receiving, by the SSL VPN gateway, a response packet from the VPN resource server, searching for a VPN instance according to a VPN label carried by the response packet, and forwarding the response packet to the user through the SSL connection according to the found VPN instance.

2. The method of claim 1, wherein the VPN instance bound with the authentication and authorization information of the user comprises a routing forwarding table entry in which a destination address is an IP address of a virtual interface V1 and a next hop is an inner loopback interface address; the virtual interface V1 is a virtual interface bound with a VPN which the user belongs to;

wherein, when the VPN resource server is accessed by using a Transmission Control Protocol (TCP) mode or a WEB mode, establishing the connection related to the remote access in the step B comprises:
  establishing the SSL connection between the user and the SSL VPN gateway when the user accesses the VPN resource server; and
  establishing a TCP connection between the virtual interface VI and the VPN resource server for the user, the virtual interface VI being a virtual interface bound with the VPN which the user belongs to; and when establishing the TCP connection, configuring a VPN instance label index for a SOCKET of the TCP connection according to the VPN instance bound with the authentication and authorization information of the user;

the step C comprises: receiving the packet sent by the user through the SSL connection, adding the VPN instance label index to the packet in a TCP layer according to information of the TCP connection established for the user; searching out, by an MPLS module, a corresponding VPN instance according to the VPN instance label index, adding the VPN instance label and the MPLS forwarding label to the packet, and forwarding the packet to the VPN resource server through the TCP connection established for the user; and the step D comprises: receiving the response packet through the TCP connection, searching for the VPN instance according to the VPN label carried by the response packet, performing matching in the found VPN instance according to a private network destination address of the response packet, obtaining the routing forwarding table entry in the VPN instance to obtain the next hop which is the inner loopback interface address, and directly forwarding the response packet to an upper layer application, and sending, by the upper layer application, the response packet to the user through the SSL connection.

3. The method of claim 2, wherein the step C comprises:
c1: after the packet enters the SSL VPN gateway through the SSL connection, removing, by an IP module located at an IP layer, a public network IP header of the packet, and sending data part of the packet to an SSL VPN service module located at an application layer through the TCP module;
c2: determining, by the SSL VPN service module, to forward the packet through the TCP connection established for the user;
c3: adding, by the TCP module located at the TCP layer, a private network IP header to the packet according to the TCP connection established for the user, and recording the VPN instance label index in the packet according to the VPN instance label index of the SOCKET;
c4: determining, by the IP module located at the IP layer through route searching, that the packet is to be forwarded by the MPLS, and forwarding the packet to the MPLS module located between a network interface and the IP layer;
c5: searching, by the MPLS module, for the corresponding VPN instance according to the VPN instance label index carried by the packet, adding the VPN label and the MPLS forwarding label to the packet according to the found VPN instance, and forwarding the packet.

4. The method of claim 3, wherein the step D comprises:
d1: after the response packet enters the SSL VPN gateway through the TCP connection, determining, by the MPLS module located between the network interface and the IP layer, a VPN to which the response packet belongs according to the VPN label carried by the response packet, and sending information of the VPN to which the response packet belongs and the response packet without the VPN label to the IP module located at the IP layer;
d2: obtaining, by the IP module, the VPN instance according to the information of the VPN to which the response packet belongs, performing matching in the obtained VPN instance according to the private network destination address of the response packet to obtain the routing forwarding table entry and the next hop which is the inner loopback interface address, and directly forwarding the response packet without the private network IP header to the SSL VPN service module located at the application layer through the TCP layer;
d3: determining, by the SSL VPN service module, that the response packet received from the TCP connection is to be forwarded to the user through the SSL connection, and forwarding the response packet to the TCP module; and
d4: adding, by the TCP module, a public network IP header to the response packet according to information of the SSL connection; forwarding, by the IP module, the response packet to the user through the SSL connection.

5. The method of claim 1, wherein the VPN instance bound with the authentication and authorization information of the user comprises a routing forwarding table entry in which a destination address is a network segment to which a virtual interface V1 belongs and a next hop is an IP address of the virtual interface V1; the virtual interface V1 is a virtual interface bound with a VPN to which the user belongs;

wherein, when the VPN resource server is accessed by using an Internet Protocol (IP) mode, establishing the multiple virtual interfaces in the step A comprises: establishing one virtual interface for each address pool established by each VPN, each address pool and a corresponding virtual interface belong to a same network segment, the step B comprises: allocating, by the SSL VPN gateway, one virtual address Add_x for the user from the address pool configured for the VPN to which the user belongs; when the user requests accessing the VPN resource server, establishing the SSL connection between the user and the SSL VPN gateway;

the step C comprises: receiving the packet carrying a private network IP header sent by the user through the SSL connection, a private network source address being the Add_x; adding a VPN instance label index to the packet at an IP layer according to a VPN instance bound with authentication and authorization information of the user, adding, by an MPLS module, a VPN label and an MPLS forwarding label to the packet according to the VPN instance label index, and sending the packet to the VPN resource server through a direct IP forwarding mode according to the private network IP header carried by the packet;

the step D comprises: receiving the response packet, searching for the VPN instance according to the VPN label carried by the response packet, performing matching in the found VPN instance according to a private network destination address Add_x of the response packet to obtain the routing forwarding table entry and a next hop which is a virtual interface V1, and forwarding the response packet to the user through the SSL connection via the virtual interface V1.

6. The method of claim 5, wherein the step C comprises:

c1: after the packet enters the SSL VPN gateway through the SSL connection, removing, by an IP module located at the IP layer, the public network IP header of the packet, and sending the packet with a private network IP header and data part to a first IP access mode processing module located at an application layer; sending, by the first IP access mode processing module, the packet to a second IP access mode processing module located at the IP layer;

c2: determining, by the second IP access mode processing module, to forward the packet in a direct IP forwarding mode, and sending the packet to the VPN label processing module in the IP layer;

c3: adding, by the VPN label processing module, a VPN instance label index to the packet according to the VPN instance bound with the authentication and authorization information of the user, and forwarding the packet to the IP module;

c4: determining, by the IP module by using route searching, that the packet is to be forwarded by MPLS, and forwarding the packet to the MPLS module located between a network interface and the IP layer;

c5: searching, by the MPLS module, for a corresponding VPN instance according to the VPN instance label index carried by the packet, adding the VPN label and the MPLS forwarding label to the packet according to the found VPN instance, and forwarding the packet.

7. The method of claim 6, wherein the step D comprises:

d1: after the response packet enters the SSL VPN gateway, determining, by the MPLS module located between the network interface and the IP layer, a VPN to which the response packet belongs according to a VPN label carried by the response packet, and sending information of the VPN to which the response packet belongs and the response packet without the VPN label to the IP module;

d2: obtaining, by the IP module, a corresponding VPN instance according to the information of the VPN to which the response packet belongs, and performing matching according to a private network destination address Add_x of the response packet to obtain the routing forwarding table entry and the next hop which is the virtual interface V1;

d3: determining, by the second IP access mode processing module located at the IP layer, that the response packet is to be forwarded to the user through the SSL connection, and forwarding the response packet to the first IP access mode processing module located at the application layer, and sending, by the first IP access mode processing module, the response packet to the TCP module located at the TCP layer;

d4: adding, by the TCP module, a public network IP header to the response packet according to information of the SSL connection; forwarding, by the IP module, the response packet to the user through the SSL connection.

8. The method of claim 1, further comprising:

after the VPN is bound with the virtual interface and the authentication and authorization information of the users is bound with the VPN instances, forming a relation table; the relation table comprising user identities, authentication and authorization information of the users, the virtual interfaces and label indexes of the bound VPN instances.

9. The method of claim 1, wherein the authentication and authorization information comprises at least one of a user group, a virtual area and a role.

10. The method of claim 1, wherein the virtual interface is an SSL VPN virtual Ethernet network interface or a loopback interface.

11. A gateway, applied to a system in which a remote user accesses a Virtual Private Network (VPN) resource server in a Multi-Protocol Label Switching Virtual Private Network (MPLS VPN) through a Secure Socket Layer (SSL) connection between the remote user and the gateway, functioning as an SSL VPN gateway in an SSL VPN and a Provider Edge (PE) router in the MPLS VPN, and comprising:

a configuration unit, a first network interface, a second network interface, a processing unit, a VPN instance storing unit and a relation storing unit;

wherein the configuration unit is configured to establish multiple virtual interfaces, one virtual interface being bound with one VPN, form VPN instances according to the virtual interfaces bound with the VPNs, save the VPN instances in the VPN instance storing unit; differentiate different VPN users according to authentication and authorization information of users, bind the authentication and authorization information of the users with corresponding VPNs respectively; save binding relations in the relation storing unit;

wherein the relation storing unit is configured to store the binding relations established by the configuration unit;

wherein the VPN instance storing unit is configured to store the VPN instances; wherein the first network interface is configured to provide a data transmission channel between the gateway and the users;

wherein the second network interface is configured to provide a data transmission channel between the gateway and an MPLS network;

wherein the processing unit is configured to perform information interaction with a user and establish a connection related to a remote access; when receiving a packet sent by the user through the SSL connection, obtain a VPN instance bound with authentication and authorization information of the user from the VPN instance storing unit according to a binding relation stored in the relation storing unit, add a VPN label and an MPLS forwarding label to the packet by using the VPN instance obtained, send the packet to the VPN resource server through the MPLS network; when receiving a response packet from the VPN resource server, search for a corresponding VPN instance in the VPN instance storing unit according to a VPN label carried by the response packet, and forward the response packet to the user through the SSL connection according to the found VPN instance.

12. The gateway of claim 11, wherein the VPN instance bound with the authentication and authorization information of the user comprises a routing forwarding table entry in which a destination address is an IP address of a virtual interface V1 and a next hop is an inner loopback interface address; the virtual interface V1 is a virtual interface bound with the VPN to which the user belongs;

when the VPN resource server is accessed by using a Transmission Control Protocol (TCP) mode or a WEB mode, the processing unit is further configured to:
establish the SSL connection between the user and the gateway where the processing unit is located when the user accesses the VPN resource server; establish a TCP connection between the virtual interface V1 and the VPN resource server requested to be accessed for the user; while establishing the TCP connection, configure a VPN instance label index for a SOCKET of the TCP connection according to the VPN instance bound with the authentication and authorization information of the user;
when receiving the packet sent by the user through the SSL connection, add the VPN instance label index to the packet at the TCP layer according to information of the TCP connection established for the user; search out, by an MPLS module in the processing unit, a VPN instance according to the VPN instance label index, add the VPN instance label and the MPLS forwarding label to the packet, and forward the packet to the VPN resource server through the TCP connection established for the user;
when receiving the response packet through the TCP connection, search for a corresponding VPN instance according to a VPN label carried by the response packet, perform matching in the found VPN instance according to a private network destination address of the response packet to obtain the routing forwarding table entry and the next hop which is the inner loopback interface address, directly forward the response packet to an upper layer application; wherein the upper layer application sends the response packet to the user through the SSL connection.

13. The gateway of claim 12, wherein the processing unit comprises an SSL VPN service module and a VPN label processing module which are located at the application layer, a TCP module located at the TCP layer, an IP module located at the IP layer and an MPLS module located between the IP layer and a network interface;
wherein the SSL VPN service module is configured to establish the SSL connection between the user and the gateway when the user accesses the VPN resource server; establish the TCP connection between the virtual interface V1 and the VPN resource server for the user;
the VPN label processing module is configured to, during a process of establishing the TCP connection, configure the VPN instance label index for a SOCKET of the TCP connection according to the VPN instance bound with the authentication and authorization information of the user;
wherein, when the packet enters the gateway through the SSL connection, the IP module is configured to remove a public network IP header of the packet, send data part of the packet to the SSL VPN service module through the TCP module;
the SSL VPN module is further configured to determine to forward the packet through the TCP connection established for the user, and send the packet to the TCP module;
the TCP module is configured to add a private network IP header to the packet according to the TCP connection established for the user, record the VPN instance label index in the packet according to the VPN instance label index of the SOCKET, and send the packet to the IP module;
the IP module is configured to determine that the packet is to be forwarded by MPLS by using route searching, and forward the packet to the MPLS module; and
the MPLS module is configured to search for a corresponding VPN instance according to the VPN instance label index carried by the packet, add the VPN label and the MPLS forwarding label to the packet according to the found VPN instance, and forward the packet;
wherein, after the response packet enters the gateway through the TCP connection, the MPLS module is configured to determine a VPN to which the response packet belongs according to a VPN label carried by the response packet, and send information of the VPN to which the response packet belongs and the response packet without the VPN label to the IP module;
the IP module is further configured to obtain a VPN instance from the VPN instance storing unit according to information of the VPN to which the response packet belongs, perform matching in the obtained VPN instance according to the private network destination address of the response packet to obtain the routing forwarding table entry and the next hop which is the inner loopback interface address, and directly forward the response packet without the private network IP header to the SSL VPN service module through the TCP layer;
the SSL VPN service module is further configured to determine that the response packet received through the TCP connection is to be forwarded to the user through the SSL connection, and forward the response packet to the TCP module; and
the TCP module is further configured to add a public network IP header to the response packet according to the information of the SSL connection, and the IP module is further configured to forward the response packet to the user through the SSL connection.

14. The gateway of claim 11, wherein the VPN instance bound with the authentication and authorization information of the user comprises a routing forwarding table entry in which a destination address is a network segment to which a virtual interface V1 belongs and a next hop is an IP address of the virtual interface V1; the virtual interface V1 is a virtual interface bound with a VPN to which the user belongs;
when the VPN resource server is accessed by using a Internet Protocol (IP) mode, the configuration unit is configured to establish one virtual interface for each address pool established by the VPN while establishing the multiple virtual interfaces, an address pool and a corresponding virtual interface belong to a same network segment;
the processing unit is further configured to:
when establishing the connection related to the remote access, allocate one virtual address Add_x for the user from the address pool configured for a VPN to which the user belongs, establish the SSL connection between the user and the gateway where the processing unit is located;
when receiving the packet carrying a private network IP header sent by the user through the SSL connection, add a VPN instance label index to the packet at the IP layer according to a VPN instance bound with the authentication and authorization information of the user; and the MPLS module in the processing unit is configured to add the VPN label and the MPLS forwarding label to the packet according to the VPN instance label index; the private network source address being the Add_x;

when receiving the response packet, search for a VPN instance according to a VPN label carried by the response packet, perform matching in the found VPN instance according to the private network destination address Add_x of the response packet to obtain the routing forwarding table entry and the next hop which is the virtual interface V1, forward the response packet to the user through the SSL connection via the virtual interface V1.

15. The gateway of claim 14, wherein the processing unit comprises a first IP access mode processing module located at an application layer, a second IP access mode processing module located at an IP layer, and a VPN label processing unit and an IP module which are located at the IP layer, a TCP module located at a TCP layer, and an MPLS module located between the IP layer and a network interface;

the first IP access mode processing module located at the application layer is configured to allocate the virtual address Add_x for the user from the address pool configured for the VPN to which the user belongs, establish the SSL connection between the user and the gateway where the processing unit is located when the user requests accessing the VPN resource server;

wherein, after the packet enters the gateway through the SSL connection, the IP module is configured to remove the public network IP header of the packet and send the packet with a private network IP header and data part to the first IP access mode processing module located at the application layer through the TCP module; the first IP access mode processing module is configured to directly send the packet to the second IP access mode processing module located at the IP layer;

the second IP access mode processing module is further configured to determine to forward the packet in a direct IP forwarding mode, and send the packet to the VPN label processing module;

the VPN label processing module is configured to search for the VPN instance bound with the authentication and authorization information of the user according to a binding relation stored in the relation storing unit, add the VPN instance label index to the packet, and forward the packet to the IP module;

the IP module is configured to determine, by using route searching, that the packet is to be forwarded by MPLS, and forward the packet to the MPLS module; and the MPLS module is configured to search for a VPN instance according to the VPN instance label index carried by the packet, add the VPN label and the MPLS forwarding label to the packet according to the found VPN instance, and forward the packet;

wherein, after the response packet enters the SSL VPN gateway through a second network interface, the MPLS module is further configured to determine a VPN to which the response packet belongs according to a VPN label carried by the response packet, and send information of the VPN to which the response packet belongs and the response packet without the VPN label to the IP module;

the IP module is further configured to obtain the VPN instance from the VPN instance storing unit according to the information of the VPN to which the response packet belongs, and perform matching in the obtained VPN instance according to the private network destination address Add_x of the response packet to obtain the routing forwarding table entry and the next hop which is the virtual interface V1;

the second IP access mode processing module located at the IP layer is further configured to determine that the response packet is to be forwarded to the user through the SSL connection via the virtual interface V1, and forward the response packet to the first IP access mode processing module located at the application layer; and the first IP access mode processing module is further configured to send the response packet to the TCP module located at the TCP layer; and the TCP module is configured to add a public network IP header to the response packet according to the information of the SSL connection; and the IP module is further configured to forward the response packet to the user through the SSL connection.

16. The gateway of claim 11, wherein the authentication and authorization information comprises at least one of a user group, a virtual area and a role.

17. The gateway of claim 11, wherein the virtual interface is an SSL VPN virtual Ethernet network interface or a loopback interface.

18. The gateway of claim 11, wherein the binding relations are in a relation table comprising user identities, authentication and authorization information of the users, the virtual interfaces and label indexes of the bound VPN instances.

19. A system for remotely accessing a Multi-Protocol Label Switching Virtual Private Network (MPLS VPN), comprising the gateway claimed at any of claims 11 to 18.

* * * * *